Patented Oct. 28, 1952

2,615,869

UNITED STATES PATENT OFFICE 2,615,869

COPOLYMERS OF VINYLIDENE CYANIDE WITH VINYL CHLORIDE

Vernon L. Folt, Akron, Ohio, assignor to The B. F. Goodrich Company, New York, N. Y., a corporation of New York No Drawing. Application February 14, 1950, Serial No. 144,196

3 Claims. (Cl. 260—78.5)

This invention relates to the preparation of novel copolymers of vinylidene cyanide with vinyl chloride, which copolymers are extremely useful synthetic resins especially in the preparation of filaments and films.

In U. S. Patent 2,476,270 to Alan E. Ardis, and in copending applications, Serial No. 63,434, filed December 3, 1948, now U. S. Patent 2,502,412, and Serial No. 79,712, filed March 4, 1949, now U. S. Patent 2,514,387, novel methods for the preparation of monomeric vinylidene cyanide are disclosed. These methods involve, respectively, the pyrolysis at 400° C. to 750° C. of 1-acetoxy-1,1-dicyano ethane, the pyrolysis of 1,1,3,3-tetracyanopropane and the pyrolysis at 400° C. to 800° C. of 4,4-dicyanocyclohexene, 4,4-dicarbamyl cyclohexene or 4-cyano-4-carbamyl cyclohexene. In another copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3 it reacts therewith to give solid 4,4-dicyanocyclohexene.

It has now been discovered that when monomeric vinylidene cyanide of the above physical and chemical characteristics is copolymerized with vinyl chloride, in the presence of a free radical polymerization catalyst and in a manner such that the polymerization charge contains from 5 to 45 mole per cent of monomeric vinylidene cyanide new and highly useful copolymers are obtained. These copolymers are essentially 1:1 alternating copolymers, that is, copolymers possessing the structure:

—$M_1$—$M_2$($M_1$—$M_2$)$_x$$M_1$—$M_2$— wherein each $M_1$ is a vinylidene cyanide unit

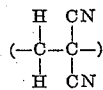

each $M_2$ is a unit of vinyl chloride

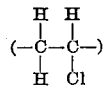

and $x$ is a poly digit number, preferably from 100 to 15,000.

The fact that the copolymers thus obtained are essentially 1:1 alternating copolymers is determined by analysis of the copolymer for nitrogen and/or chlorine content which shows that the two monomers enter the polymer chain in essentially equimolar ratios regardless of the degree of monomer to polymer conversion and of charging ratio provided the latter is within the range of 5 to 45 mole per cent vinylidene cyanide. Further supporting evidence for this fact is found in the copolymerization equation of F. M. Lewis, C. Walling, et al., Journal of the American Chemical Society, 70, 1519 (1948):

$$\frac{d[M_1]}{d[M_2]} = \frac{[M_1]}{[M_2]} \frac{r_1[M_1]+[M_2]}{r_2[M_2]+[M_1]}$$

wherein $M_1$=Concentration of unreacted monomer $M_1$
$M_2$=Concentration of unreacted monomer $M_2$
$r_1$=Ratio of the rate constants for the reaction of an $M_1$ type radical with $M_1$ and $M_2$ respectively
$r_2$=Ratio of the rate constants for the reaction of an $M_2$ type radical with $M_2$ and $M_1$ respectively When the product of $r_1$ and $r_2$ (the values of $r_1$ and $r_2$ being determined by solving the equation for $r_1$ and $r_2$) is equivalent to zero, a 1:1 alternating copolymer is formed, that is, a copolymer having the

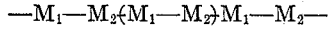

structure shown hereinabove. When $M_1$ is vinylidene cyanide, and $M_2$ is vinyl chloride it has been found that $r_1$=0.72 and $r_2$=0.0093; therefore, the product of $r_1$ and $r_2$ is 0.0071, or approaches zero, so that the equation indicates that essentially alternating copolymers are formed.

The polymerization of this invention can be carried out in a number of ways. Since the monomers are mutually soluble in one another, the polyberization may be carried out without the use of a solvent or other liquid medium for the monomers simply by mixing the two monomers with the catalyst, and then heating the resulting mixture to a temperature of from about 30° C. to 80° C., and preferably about 50° C., whereupon polymerization occurs to form the desired copolymer as a white resinous insoluble powder of small particle size. The copolymer thus formed is conveniently separated from the polymerization mixture by adding benzene or other liquid aromatic hydrocarbon to dissolve the remaining monomers and then filtering off the copolymer.

A preferred mode of operation consists in first introducing the catalyst into a polymerizer provided with air tight closure means. A vacuum is then created in the polymerizer and the polymerizer is cooled to temperatures below about 0° C. while gaseous vinyl chloride is introduced. The vacuum is then broken and liquid vinylidene cyanide is added volumerically. The polymerizer is then sealed to the air and brought to the desired polymerization temperature, preferably with constant agitation of the polymerization mixture. When the desired degree of conversion has occurred, the mixture is cooled to about —70° C. to stop the polymerization, the polymerizer is opened and the copolymer is separated from the polymerization mixture in the manner described in the foregoing paragraph. If desired, benzene or other aromatic hydrocarbons may be introduced into the polymerizer together with the catalyst, thus facilitating recovery of the copolymer, since the monomers remaining after the polymerization is stopped will be in solution in the aromatic hydrocarbon and the copolymer can be readily recovered simply by passing the contents of the polymerizer through a suitable filter.

The use of polymerization temperatures in the range of 30 to 80° C. is preferred but not at all critical since polymerization will occur at temperatures as low as 0° C. or as high as 100° C.

It is to be understood that regardless of the polymerization method utilized, the polymerization should be stopped before monomeric vinylidene cyanide is entirely consumed, in order that substantially pure copolymer will be obtained. Otherwise, when the vinylidene cyanide is completely used up, the product will contain straight polymer resulting from the poymerization of the remaining vinyl chloride. Accordingly, it is often desirable to add, coninuously or intermittently, fresh quantities of vinylidene cyanide, and also of catalyst and solvent if desired, to the polymerization mixture during the course of the polymerization, thus taking fullest advantage of the capacity of the equipment and in effect operating a continuous or semi-continuous process.

The catalyst which is utilized in the polymerization process is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, and the like. In general, from 0.01 to 2.0% by weight (based on the total weight of the monomers charged) of the catalyst is utilized, although smaller or larger amounts may be utilized if desired. By regulating the amount of the catalyst employed it is possible to control very effectively and accurately the molecular weight of the copolymer. For instance, to obtain a high-molecular weight copolymer, a small quantity of catalyst is used, while lower molecular weight copolymers are obtained by the use of larger amounts of catalyst.

The rate of copolymerization can also be controlled by regulating the catalyst concentration. It has been determined that the copolymerization rate is proportional to the square root of the catalyst concentration, and accordingly, the rate of copolymerization increases when the catalyst concentration increases, the converse also being true.

The following examples illustrate the preparation of copolymers of vinylidene cyanide with vinyl chloride in accordance with this invention, but are not to be construed as a limitation upon the scope thereof, for there are, of course, numerous possible variations and modifications.

*Examples I to VIII*

A series of vinylidene cyanide:vinyl chloride copolymers are prepared from charges containing mole percentages of vinylidene cyanide varying from approximately 5 to 45. In the procedure utilized, 0.30% by weight (based on the total weight of monomers to be charged) of o,o'-dibromobenzoyl peroxide is placed in a polymerizer; the polymerizer is then evacuated and immersed in a Dry-Ice/acetone bath and the vinyl chloride introduced into the evacuated polymerizer. The vacuum is then broken and the vinylidene cyanide added. The polymerizer is then sealed, heated to a temperature of about 50° C. and agitated constantly. After periods of time varying from 4.5 to 16 hours the polymerization is stopped by cooling the polymerizer to a temperature of about —70° C. Benzene is added to the contents of the polymerizer and the resultant benzene slurry is filtered to give a high molecular weight resinous copolymer of vinylidene cyanide with vinyl chloride. In the table below there are recorded the mole per cent vinylidene cyanide in the charge, the time during which the polymerization is permitted to continue, the per cent monomer to polymer conversion (based on total weight of monomers present) and the mole per cent vinylidene cyanide in the resulting copolymer (based on nitrogen analysis):

| Example | Mole Percent Vinylidene Cyanide Charged | Polymerization Time (Hours) | Percent Conversion | Mole Percent Vinylidene Cyanide in Copolymer |
|---|---|---|---|---|
| I | 4.04 | 8.0 | 2.0 | 44.00 |
| II | 8.17 | 8.0 | 4.0 | 48.38 |
| III | 12.38 | [1] 8.0 to 16.5 | [2] 2.0 to 10.0 | 49.47 |
| IV | 16.68 | [1] 8.0 to 16.5 | [2] 2.0 to 14.0 | 50.65 |
| V | 21.06 | [1] 8.0 to 16.5 | [2] 2.0 to 20.0 | 51.15 |
| VI | 25.54 | [1] 8.0 to 16.5 | [2] 2.0 to 24.0 | 52.20 |
| VII | 34.80 | [1] 8.0 to 16.5 | [2] 2.0 to 24.0 | 55.84 |
| VIII | 44.46 | [1] 8.0 to 16.5 | [2] 2.0 to 25.0 | 59.70 |

[1] Several runs carried out at polymerization times within this range, utilizing the same charging ratios.
[2] Several runs carried out using identical monomer mixtures polymerized to various conversions within this range.

It will be seen from the above examples that an essentially 1:1 alternating copolymer is obtained when the polymerization charge contains from 5 to 45 mole per cent of vinylidene cyanide. When the polymerization is carried out according to other of the methods described hereinabove, or at temperatures higher or lower than about 50° C., or utilizing other of the peroxygen catalysts herein disclosed, the essentially 1:1 alternating copolymer is again readily obtained.

The copolymers of vinylidene cyanide with vinyl chloride prepared according to this invention are useful in the preparation of solutions from which can be spun fibers and filaments of any desired size. Such synthetic fibers and filaments possess many advantageous properties including extremely high strength, low elongation, excellent resistance to weathering and excellent resistance to the action of chemicals. The copolymers, and fibers and filaments thereof, are not degraded, even after being soaked in a sodium hydroxide solution for in excess of 24 hours.

To illustrate the preparation of fibers and filaments, the copolymers obtained in the above examples are dissolved in dimethyl formamide to give viscous, stable solutions which are spun through a spinneret into a spinning bath to give excellent filaments. The physical properties of these filaments are excellent and can be even further improved by a "hot-stretching" process, whereby the filament is stretched in a hot zone in a series of steps, a process disclosed in a copending application, Serial No. 113,018, filed August 29, 1949. In addition to dimethyl formamide, other solvents for the copolymers may also advantageously be used, and the copolymer solutions are also useful for the casting of valuable films. Moreover, since the vinylidene cyanide-vinyl chloride copolymers of this invention have a very high but definite softening point (above 200° C.) they are useful in melt spinning and in the preparation of molded objects for use in applications where thermal stability is essential.

Although specific examples of the invention have been herein described, it is not intended to limit the invention solely thereto, but to include all of the variations and modifications falling within the spirit and scope of the appended claims.

I claim:

1. A copolymer of vinylidene cyanide and vinyl chloride, said copolymer possessing essentially the structure

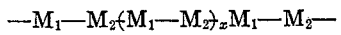

wherein each $M_1$ represents a vinylidene cyanide unit, each $M_2$ represents a unit of said vinyl chloride and $x$ is a polydigit number, in which copolymer the vinylidene cyanide units are derived from monomeric vinylidene cyanide which is a liquid at room temperature and a crystalline solid at 0° C., having a melting point, when in purest form, of substantially 9.0° C. to 9.7° C., and being characterizable chemically by the ability to undergo on contact with water at room temperature an instantaneous homopolymerization reaction to give a solid, water-insoluble resin.

2. The method which comprises introducing vinyl chloride into a closed vessel containing a peroxygen catalyst and being maintained at a reduced pressure and at a temperature below about 0° C., allowing the pressure in said vessel to rise to substantially atmospheric pressure, and introducing vinylidene cyanide into said vessel, the said vinylidene cyanide being present in an amount from 5 to 45 mole per cent based on the total monomer weight and being a liquid at room temperature and a crystalline solid at 0° C. having a melting point, when in purest form, of substantially 9.0° C. to 9.7° C. and being characterizable chemically by the ability to undergo on contact with water at room temperature an instantaneous homopolymerization reaction to give a solid water-insoluble resin, and maintaining the resulting mixture at a temperature of from 30° C. to 80° C. for a time sufficient to effect copolymerization of the said vinylidene cyanide and vinyl chloride and formation of a solid, resinous copolymer possessing the structure

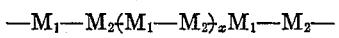

wherein each $M_1$ is a vinylidene cyanide unit, each $M_2$ is a vinyl chloride unit and $x$ is a polydigit number.

3. The method of claim 2 wherein the peroxygen catalyst is o,o'-dibromobenzoyl peroxide.

VERNON L. FOLT.

REFERENCES CITED

The following references are of record in the file of this patent:

UNITED STATES PATENTS

| Number | Name | Date |
|---|---|---|
| 2,455,653 | Bralley | Dec. 7, 1948 |
| 2,462,422 | Plambeck | Feb. 22, 1949 |
| 2,466,395 | Dickey | Apr. 5, 1949 |